United States Patent
Spyrou

(10) Patent No.: US 7,307,135 B2
(45) Date of Patent: *Dec. 11, 2007

(54) HIGH-REACTIVITY LIQUID POLYURETHANE SYSTEMS WHICH CONTAIN URETDIONE GROUPS AND CAN BE CURED AT A LOW TEMPERATURE

(75) Inventor: Emmanouil Spyrou, Dorsten (DE)

(73) Assignee: Degussa AG, Duesseldorf (DE)

( * ) Notice: Subject to any disclaimer, the term of this patent is extended or adjusted under 35 U.S.C. 154(b) by 5 days.

This patent is subject to a terminal disclaimer.

(21) Appl. No.: 10/958,469

(22) Filed: Oct. 6, 2004

(65) Prior Publication Data

US 2005/0096451 A1 May 5, 2005

(30) Foreign Application Priority Data

Oct. 9, 2003 (DE) ................ 103 46 957

(51) Int. Cl.
- C08G 18/16 (2006.01)
- C08G 18/18 (2006.01)
- C08G 18/22 (2006.01)
- C08G 18/40 (2006.01)
- C08G 18/48 (2006.01)
- C08G 18/80 (2006.01)

(52) U.S. Cl. ............... 528/48; 528/45; 528/48; 528/52; 528/55; 525/67; 525/85; 525/440

(58) Field of Classification Search ......... 528/45, 528/52, 53, 54, 60, 65, 66, 73, 76, 48; 525/453, 525/440, 123, 124, 424

See application file for complete search history.

(56) References Cited

U.S. PATENT DOCUMENTS

| | | | |
|---|---|---|---|
| 3,226,354 A * | 12/1965 | Heiss | 524/871 |
| 4,246,380 A | 1/1981 | Gras et al. | |
| 4,302,351 A | 11/1981 | Gras et al. | |
| 4,443,590 A * | 4/1984 | Kamatani et al. | 528/51 |
| 4,463,154 A | 7/1984 | Disteldorf et al. | |
| 4,483,798 A | 11/1984 | Disteldorf et al. | |
| 5,354,834 A * | 10/1994 | Yoshida et al. | 528/59 |
| 5,614,323 A | 3/1997 | Chang | |
| 5,753,733 A | 5/1998 | Eck et al. | |
| 5,847,044 A | 12/1998 | Laas et al. | |
| 6,914,115 B2 | 7/2005 | Spyrou et al. | |
| 2003/0153713 A1* | 8/2003 | Spyrou et al. | 528/48 |
| 2004/0214912 A1* | 10/2004 | Rink et al. | 522/126 |
| 2004/0219367 A1 | 11/2004 | Spyrou et al. | |
| 2005/0003206 A1 | 1/2005 | Spyrou et al. | |
| 2005/0085615 A1 | 4/2005 | Wenning et al. | |
| 2005/0090627 A1 | 4/2005 | Wenning et al. | |
| 2005/0090636 A1 | 4/2005 | Wenning et al. | |
| 2005/0096451 A1 | 5/2005 | Spyrou | |
| 2005/0239956 A1 | 10/2005 | Spyrou et al. | |
| 2005/0239992 A1 | 10/2005 | Spyrou et al. | |

FOREIGN PATENT DOCUMENTS

| | | |
|---|---|---|
| DE | 2735497 A1 | 2/1979 |
| DE | A 3030572 | 3/1982 |
| DE | A 3030 539 | 4/1982 |
| DE | 37 39 549 A1 | 6/1989 |
| DE | 197 28 855 A1 | 1/1999 |
| EP | DE 2712931 A1 | 9/1978 |
| EP | 0 045 994 | 2/1982 |
| EP | 0 669 353 A1 | 8/1995 |
| EP | 0 803 524 | 10/1997 |
| EP | 1 334 987 | 8/2003 |
| EP | 1 334 987 A2 | 8/2003 |
| EP | 1 362 873 | 11/2003 |
| GB | 1367086 | * 9/1974 |
| WO | 03/016376 | * 2/2003 |

OTHER PUBLICATIONS

U.S. Appl. No. 10/958,357, filed Oct. 6, 2004, Spyrou et al.
U.S. Appl. No. 10/591,815, filed Sep. 6, 2006, Spyrou.
U.S. Appl. No. 10/591,814, filed Sep. 6, 2006, Spyrou et al.
U.S. Appl. No. 11/576,851, filed Apr. 6, 2007, Spyrou et al.
U.S. Appl. No. 11,576,703, filed Apr. 5, 2007, Spyrou et al.
U.S. Appl. No. 11/722,740, filed Jun. 25, 2007, Spyrou et al.

* cited by examiner

Primary Examiner—Rabon Sergent
Assistant Examiner—Benjamin Gillespie
(74) Attorney, Agent, or Firm—Oblon, Spivak, McClelland, Maier & Neustadt, P.C.

(57) ABSTRACT

A high-reactivity liquid polyurethane composition which contains at least one uretdione group and cures at a low baking temperature can be used for producing plastics, particularly surface coatings and adhesives. The polyurethane composition contains A) at least one curing agent which contains at least one uretdione group and is obtained from i) an aliphatic polyisocyanate, a (cyclo)aliphatic polyisocyanate, a cycloaliphatic polyisocyanate or mixtures thereof, and ii) at least one hydroxyl-containing compound, the curing agent having a free NCO content of less than 5% by weight and a uretdione content of from 1 to 18% by weight; and B) at least one catalyst.

34 Claims, No Drawings

HIGH-REACTIVITY LIQUID POLYURETHANE SYSTEMS WHICH CONTAIN URETDIONE GROUPS AND CAN BE CURED AT A LOW TEMPERATURE

BACKGROUND OF THE INVENTION

1. Field of the Invention

The present invention relates to a high-reactivity liquid polyurethane composition which contains uretdione groups and cures at a low baking temperature, to a process for preparing the polyurethane composition and to its use for producing plastics, particularly surface coatings and adhesives.

2. Description of the Related Art

Externally or internally blocked polyisocyanates are valuable crosslinkers for thermally crosslinkable polyurethane (PU) coating and adhesive compositions.

For instance, DE-A 27 35 497 describes PU coatings having an outstanding weathering stability and thermal stability. The crosslinkers whose preparation is described in DE-A 27 12 931 are composed of ε-caprolactam-blocked isophorone diisocyanate containing isocyanurate groups. Also known are polyisocyanates containing urethane, biuret or urea groups, whose isocyanate groups are likewise blocked.

The drawback of these externally blocked systems lies in the elimination of the blocking agent during the thermal crosslinking reaction. Since the blocking agent may thus be emitted to the environment it is necessary on ecological and workplace safety grounds to take particular measures to clean the outgoing air and to recover the blocking agent. The crosslinkers, moreover, are of low reactivity. Curing temperatures above 170° C. are required.

DE-A 30 30 539 and DE-A 30 30 572 describe processes for preparing polyaddition compounds which contain uretdione groups and whose terminal isocyanate groups are irreversibly blocked with monoalcohols or monoamines. Particular drawbacks are the chain-terminating constituents of the crosslinkers, which lead to low network densities in the PU coatings and hence to moderate solvent resistances.

Hydroxyl-terminated polyaddition compounds containing uretdione groups are subject matter of EP 0 669 353. Because of their functionality of two, they exhibit improved resistance to solvents. Compositions based on these polyisocyanates containing uretdione groups share the feature that, during the curing reaction, they do not emit any volatile compounds. At not less than 180° C., however, the baking temperatures are at a high level.

The use of amidines as catalysts in PU coating compositions is described in

EP 0 803 524. Although these catalysts do lead to a reduction in the curing temperature they exhibit considerable yellowing, which is generally unwanted in the coatings sector. The cause of this yellowing is presumed to be the reactive nitrogen atoms in the amidines. They are able to react with atmospheric oxygen to form N oxides, which are responsible for the discoloration.

EP 0 803 524 also mentions other catalysts which have been used to date for this purpose, but without indicating any particular effect on the curing temperature. Such catalysts include the organometallic catalysts known from polyurethane chemistry, such as dibutyltin dilaurate (DBTL), or tertiary amines, such as 1,4 diazabicyclo[2.2.2]octane (DABCO), for example.

SUMMARY OF THE INVENTION

It is therefore an object of the present invention to provide a liquid, high-reactivity polyurethane composition containing uretdione groups. The composition should be curable even at very low temperatures and should be particularly suitable for producing plastics and also for producing high-gloss or matt, light-stable and weather-stable coatings of high reactivity, particularly for coating compositions and adhesive compositions.

This and other objects have been achieved by the present invention the first embodiment of which includes a high-reactivity liquid polyurethane composition, comprising:

A) at least one curing agent which contains at least one uretdione group and is obtained from i) an aliphatic polyisocyanate, a (cyclo)aliphatic polyisocyanate, a cycloaliphatic polyisocyanate or mixtures thereof, and ii) at least one hydroxyl-containing compound, said curing agent having a free NCO content of less than 5% by weight and a uretdione content of from 1 to 18% by weight;

B) at least one catalyst selected from the group consisting of 1) catalysts of the formula

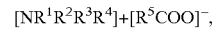

wherein $R^1$ to $R^4$ simultaneously or independently of one another are alkyl, aryl, aralkyl, heteroaryl or alkoxyalkyl radicals having 1 to 18 carbon atoms, in each case linear or branched, unbridged or bridged with other radicals $R^1$ to $R^4$, to form monocyclic, bicyclic or tricyclic systems, wherein a bridging atom is carbon and optionally a heteroatom and, optionally, each radical $R^1$ to $R^4$ has one or more alcohol, amino, ester, keto, thio, urethane, urea or allophanate groups, double bonds, triple bonds or halogen atoms, and $R^5$ is an alkyl, aryl, aralkyl, heteroaryl or alkoxyalkyl radical having 1 to 18 carbon atoms which is linear or branched and optionally has one or more alcohol, amino, ester, keto, thio, acid, urethane, urea or allophanate groups, double bonds, triple bonds or halogen atoms, 2) catalysts of the formula

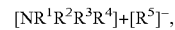

wherein $R^1$ to $R^4$ simultaneously or independently of one another are alkyl, aryl, aralkyl, heteroaryl or alkoxyalkyl radicals having 1 to 18 carbon atoms, in each case linear or branched, unbridged or bridged with other radicals $R^1$ to $R^4$, to form monocyclic, bicyclic or tricyclic systems, wherein a bridging atom is carbon and optionally a heteroatom and, optionally, each radical $R^1$ to $R^4$ has one or more alcohol, amino, ester, keto, thio, urethane, urea or allophanate groups, double bonds, triple bonds or halogen atoms, and $R^5$ is either OH or F, 3) catalysts of the formula

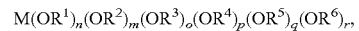

wherein M is a metal in a positive oxidation state and is identical to the sum n+m+o+p+q+r, m, o, p, q, and r are integers from 0 to 6 and the sum n+m+o+p+q+r=1 to 6, the radicals $R^1$ to $R^6$ simultaneously or independently of one another are hydrogen or alkyl, aryl, aralkyl, heteroaryl or alkoxyalkyl radicals having 1 to 8 carbon atoms and the radicals may in each case be linear or branched, unbridged or bridged with other radicals, to form monocyclic, bicyclic or tricyclic systems, wherein a bridging atom is carbon and optionally a heteroatom which optionally has one or more alcohol, amino, ester, keto, thio, urethane, urea or allophanate groups, double bonds, triple bonds or halogen atoms, wherein said catalysts 1), 2) and/or 3), individually or in mixtures, may be surrounded by an inert shell and hence encapsulated;

C) optionally, a hydroxyl-containing or amino-containing polymer having an OH number of between 20 and 500 mg KOH/g or the same amine content;

D) optionally, at least one compound which is reactive toward acid groups and has a weight fraction, based on the total formulation, of from 0.1 to 10%;

E) optionally, at least one acid in monomeric or polymeric form, in a weight fraction, based on the total formulation, of from 0.1 to 10%;

F) optionally, a solvent;

G) optionally, an auxiliary and/or an additive;

so that the fraction of the catalyst under B) is from 0.001 to 5% by weight of the total amount of the components;

wherein said composition has a melting point of below 40° C.

In another embodiment, the present invention relates to a process for preparing the above polyurethane composition, comprising:

mixing components A) and B) and optionally C)-G) in a heatable apparatus at a temperature below 130° C.

In yet another embodiment, the present invention relates to a coating, comprising the above polyurethane composition.

The present invention also provides a method of coating a substrate, comprising:

coating the substrate with the above polyurethane composition.

In another embodiment, the present invention provides a liquid polyurethane coating or an adhesive composition, comprising:

at least one catalyst selected from the group consisting of 1) catalysts of the formula

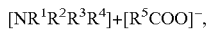

wherein $R^1$ to $R^4$ simultaneously or independently of one another are alkyl, aryl, aralkyl, heteroaryl or alkoxyalkyl radicals having 1 to 18 carbon atoms, in each case linear or branched, unbridged or bridged with other radicals $R^1$ to $R^4$, to form monocyclic, bicyclic or tricyclic systems, wherein a bridging atom is carbon and optionally a heteroatom and, optionally, each radical $R^1$ to $R^4$ has one or more alcohol, amino, ester, keto, thio, urethane, urea or allophanate groups, double bonds, triple bonds or halogen atoms, and $R^5$ is an alkyl, aryl, aralkyl, heteroaryl or alkoxyalkyl radical having 1 to 18 carbon atoms which is linear or branched and optionally has one or more alcohol, amino, ester, keto, thio, acid, urethane, urea or allophanate groups, double bonds, triple bonds or halogen atoms, 2) catalysts of the formula

wherein $R^1$ to $R^4$ simultaneously or independently of one another are alkyl, aryl, aralkyl, heteroaryl or alkoxyalkyl radicals having 1 to 18 carbon atoms, in each case linear or branched, unbridged or bridged with other radicals $R^1$ to $R^4$, to form monocyclic, bicyclic or tricyclic systems, wherein a bridging atom is carbon and optionally a heteroatom and, optionally, each radical $R^1$ to $R^4$ has one or more alcohol, amino, ester, keto, thio, urethane, urea or allophanate groups, double bonds, triple bonds or halogen atoms, and $R^5$ is either OH or F, 3) catalysts of the formula

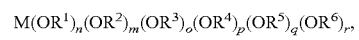

wherein M is a metal in a positive oxidation state and is identical to the sum n+m+o+p+q+r, m, o, p, q, and r are integers from 0 to 6 and the sum n+m+o+p+q+r=1 to 6, the radicals $R^1$ to $R^6$ simultaneously or independently of one another are hydrogen or alkyl, aryl, aralkyl, heteroaryl or alkoxyalkyl radicals having 1 to 8 carbon atoms and the radicals may in each case be linear or branched, unbridged or bridged with other radicals, to form monocyclic, bicyclic or tricyclic systems, wherein a bridging atom is carbon and optionally a heteroatom which optionally has one or more alcohol, amino, ester, keto, thio, urethane, urea or allophanate groups, double bonds, triple bonds or halogen atoms.

DETAILED DESCRIPTION OF THE INVENTION

Surprisingly it has been found that certain catalysts so greatly accelerate the unblocking of uretdione groups that, when uretdione-containing curing agents are used, it is possible to achieve a considerable reduction in the curing temperature of polyurethane compositions.

Conventional uretdione-containing coating and adhesive compositions can be cured only at 180° C. or above under normal conditions (DBTL catalysis). With the aid of the low-temperature-curing coating and adhesive compositions of the present invention it is possible, with a cure temperature of 100 to 160° C., not only to save on energy and cure time but also to coat or bond many temperature-sensitive substrates which at 180° C. would give rise to unwanted yellowing, decomposition and/or embrittlement phenomena. The cure temperature includes all values and subvalues therebetween, especially including 105, 110, 115, 120, 125, 130, 135, 140, 145, 150 and 155° C. Besides metal, glass, wood, leather, plastics, and MDF board, certain aluminum substrates are predestined for this application. In the case of the aluminum substrates, an excessively high temperature load sometimes to leads to an unwanted change in the crystal structure.

In the context of the present invention, the term "high-reactivity" polyurethane composition means that curing temperatures below 180° C., particularly below 150° C. can be used for curing the polyurethane composition when using the catalysts according to the present invention.

The present invention further provides high-reactivity liquid polyurethane compositions containing uretdione groups and having a melting point of below 40° C. (i.e., being liquid at room temperature or slightly above RT (room temperature)), comprising A) at least one curing agent which contains at least one uretdione group and is based on aliphatic, (cyclo)aliphatic and/or cycloaliphatic polyisocyanates and hydroxyl-containing compounds and has a free NCO content of less than 5% by weight and a uretdione content of from 1 to 18% by weight; and B) at least one catalyst selected from the group consisting of catalysts 1-3, 1. a catalyst of the formula $[NR^1R^2R^3R^4]+[R^5COO]^-$, wherein $R^1$ to $R^4$ simultaneously or independently of one another are alkyl, aryl, aralkyl, heteroaryl or alkoxyalkyl radicals having 1 to 18 carbon atoms, in each case linear or branched, unbridged or bridged with other radicals $R^1$ to $R^4$, to form monocyclic, bicyclic or tricyclic systems, it being possible for the bridging atoms to include not only carbon but also heteroatoms and, additionally, for each radical $R^1$ to $R^4$ to have one or more alcohol, amino, ester, keto, thio, urethane, urea or allophanate groups, double bonds, triple bonds or halogen atoms, and $R^5$ is an alkyl, aryl, aralkyl, heteroaryl or alkoxyalkyl radical having 1 to 18 carbon atoms which is linear or branched and additionally may have one or more alcohol, amino, ester, keto, thio, acid, urethane, urea or allophanate groups, double bonds, triple bonds or halogen atoms,
2. a catalyst of the formula $[NR^1R^2R^3R^4]+[R^5]^-$, wherein $R^1$ to $R^4$ simultaneously or independently of one another are alkyl, aryl, aralkyl, heteroaryl or alkoxyalkyl radicals having 1 to 18 carbon atoms, in each case linear or branched, unbridged or bridged with other radicals $R^1$ to $R^4$, to form monocyclic, bicyclic or tricyclic systems, it being possible for the bridging atoms to include not only carbon but also heteroatoms and, additionally, for each radical $R^1$ to $R^4$ to have one or more alcohol, amino, ester, keto, thio, acid, urethane, urea or allophanate groups, double bonds, triple bonds or halogen atoms, and $R^5$ is either OH or F,
3. a catalyst of the formula $M(OR^1)_n(OR^2)_m(OR^3)_o(OR^4)_p(OR^5)_q(OR^6)_r$, wherein M is a metal in any positive oxidation state and is identical to the sum n+m+o+p+q+r, m, o, p, q, and r are integers from 0 to 6 and the sum n+m+o+p+q+r=1 to 6, the radicals $R^1$ to $R^6$ simultaneously or independently of one another are hydrogen or alkyl, aryl, aralkyl, heteroaryl or alkoxyalkyl radicals having 1 to 8 carbon atoms and the radicals may in each case be linear or branched, unbridged or bridged with other radicals, to form monocyclic, bicyclic or tricyclic systems, and the bridging atoms may in addition to carbon also be heteroatoms and additionally may have one or more alcohol, amino, ester, keto, thio, acid, urethane, urea or allophanate groups, double bonds, triple bonds or halogen atoms, it being possible for these catalysts from the groups 1 to 3, individually or in mixtures, to be surrounded by an inert shell and hence encapsulated;

C) optionally, a hydroxyl-containing or amino-containing polymer having an OH number of between 20 and 500 mg KOH/gram or a comparable amine content;

D) optionally, at least one compound which is reactive toward acid groups and has a weight fraction, based on the total formulation, of from 0.1 to 10% by weight;

E) optionally, at least one acid in monomeric or polymeric form, in a weight fraction, based on the total formulation, of from 0.1 to 10% by weight;

F) optionally, solvents;

G) optionally, auxiliaries and additives;

so that the fraction of the catalyst under B) is from 0.001 to 5% by weight of the total amount of the components, and the two components A) and, where present, C) can be present in any desired proportion. The NCO content of the curing agent includes all values and subvalues between 0 and 5% by weight, especially including 0.5, 1, 1.5, 2, 2.5, 3, 3.5, 4 and 4.5% by weight. The uretdione content includes all values and subvalues therebetween, especially including 2, 4, 6, 8, 10, 12, 14 and 16% by weight. The OH number of component C) includes all values and subvalues therebetween, especially including 50, 100, 150, 200, 250, 300, 350, 400 and 450 mg KOH/gram. The amount of component D) includes all values and subvalues therebetween, especially including 0.5, 1, 1.5, 2, 2.5, 3, 3.5, 4, 4.5, 5, 5.5, 6, 6.5, 7, 7.5, 8, 8.5, 9 and 9.5% by weight. The amount of component E) includes all values and subvalues therebetween, especially including 0.5, 1, 1.5, 2, 2.5, 3, 3.5, 4, 4.5, 5, 5.5, 6, 6.5, 7, 7.5, 8, 8.5, 9 and 9.5% by weight. The amount of component B includes all values and subvalues therebetween, especially including 0.005, 0.01, 0.05, 0.1, 0.5, 1, 1.5, 2, 2.5, 3, 3.5, 4 and 4.5% by weight.

The present invention also provides a process for preparing polyurethane compositions in heatable apparatus at temperatures below 130° C. The temperature includes all values and subvalues between room temperature and 130° C., especially including 25, 30, 35, 40, 45, 50, 55, 60, 65, 70, 75, 80, 85, 90, 95, 100, 105, 110, 115, 120 and 125° C.

In addition, the present invention provides for the use of the polyurethane compositions of the present invention for producing paints and adhesives and also coatings on metal, plastic, glass, wood or leather substrates or other heat-resistant substrates.

The present invention also provides for the use of the polyurethane compositions of the present invention for producing adhesive bonds on metal, plastic, glass, wood or leather substrates or other heat-resistant substrates.

Likewise provided by the present invention are metal-coating compositions, particularly for automobile bodies, motorbikes and cycles, architectural components and household appliances, wood-coating compositions, glass-coating compositions, leather-coating compositions, and plastics-coating compositions.

As starting compounds for component A), polyisocyanates containing uretdione groups are well known and are described in, for example, U.S. Pat. No. 4,476,054, U.S. Pat. No. 4,912,210, U.S. Pat. No. 4,929,724, and EP 0 417 603. A comprehensive overview of industrially relevant processes for dimerizing isocyanates to uretdiones is offered by J. Prakt. Chem. 336 (1994) 185-200. Conversion of isocyanates to uretdiones takes place generally in the presence of soluble dimerization catalysts, such as dialkylaminopyridines, trialkylphosphines, phosphoramides or imidazoles, for example. The reaction, conducted optionally in solvents but preferably in their absence, is terminated by addition of catalyst poisons when a desired conversion has been reached. Excess monomeric isocyanate is separated off afterward by short-path evaporation. If the catalyst is sufficiently volatile, the reaction mixture can be freed from the catalyst at the same time as monomer is separated off. In that case there is no need to add catalyst poisons. A broad range of isocyanates is suitable in principle for the preparation of polyisocyanates containing uretdione groups. Preferred for use in accordance with the present invention are isophorone diisocyanate (IPDI), hexamethylene diisocyanate (HDI), 2-methylpentane diisocyanate (MPDI), 2,2,4-trimethylhexamethylene diisocyanate/2,4,4-trimethylhexamethylene diisocyanate (TMDI), norbornane diisocyanate (NBDI), methylenediphenyl diisocyanate (MDI), and tetramethylxylylene diisocyanate (TMXDI). More particular preference is given to IPDI and HDI.

The conversion of these polyisocyanates bearing uretdione groups to curing agents A) containing uretdione groups involves the reaction of the free NCO groups with hydroxyl-containing monomers or polymers, such as polyesters, polythioethers, polyethers, polycaprolactams, polyepoxides, polyesteramides, polyurethanes or low molecular mass di-, tri- and/or tetraalcohols as chain extenders and, optionally, monoamines and/or monoalcohols as chain extenders, and has already been frequently described (EP 0 669 353, EP 0 669 354, DE 30 30 572, EP 0 639 598 or EP 0 803 524). Preferred curing agents A) containing uretdione groups have a free NCO content of less than 5% by weight and a uretdione group content of from 1 to 18% by weight (calculated as $C_2N_2O_2$, molecular weight 84). Preference is given to polyesters and monomeric dialcohols. Besides the uretdione groups, the curing agents A) may also contain isocyanurate, biuret, allophanate, urethane and/or urea structures.

The present invention also provides for the use of at least one catalyst selected from the groups of the catalysts 1-3, 1. a catalyst of the formula $[NR^1R^2R^3R^4]+[R^5COO]^-$, wherein $R^1$ to $R^4$ simultaneously or independently of one another are alkyl, aryl, aralkyl, heteroaryl or alkoxyalkyl radicals having 1 to 18 carbon atoms, in each case linear or branched, unbridged or bridged with other radicals $R^1$ to $R^4$, to form monocyclic, bicyclic or tricyclic systems, it being possible for the bridging atoms to include not only carbon but also heteroatoms and, additionally, for each radical $R^1$ to $R^4$ to have one or more alcohol, amino, ester, keto, thio, urethane, urea or allophanate groups, double bonds, triple bonds or halogen atoms, and $R^5$ is an alkyl, aryl, aralkyl, heteroaryl or alkoxyalkyl radical having 1 to 18 carbon atoms which is linear or branched and additionally may have one or more alcohol, amino, ester, keto, thio, acid, urethane, urea or allophanate groups, double bonds, triple bonds or halogen atoms,
2. a catalyst of the formula $[NR^1R^2R^3R^4]+[R^5]^-$, wherein $R^1$ to $R^4$ simultaneously or independently of one another are alkyl, aryl, aralkyl, heteroaryl or alkoxyalkyl radicals having 1 to 18 carbon atoms, in each case linear or branched, unbridged or bridged with other radicals $R^1$ to $R^4$, to form monocyclic, bicyclic or tricyclic systems, it being possible for the bridging atoms to include not only carbon but also heteroatoms and, additionally, for each radical $R^1$ to $R^4$ to have one or more alcohol, amino, ester, keto, thio, acid, urethane, urea or allophanate groups, double bonds, triple bonds or halogen atoms, and $R^5$ is either OH or F,
3. a catalyst of the formula $M(OR^1)_n(OR^2)_m(OR^3)_o(OR^4)_p(OR^5)_q(OR^6)_r$, wherein M is a metal in any positive oxidation state and is identical to the sum n+m+o+p+q+r, m, o, p, q, and r are integers from 0 to 6 and the sum n+m+o+p+q+r=1 to 6, the radicals $R^1$ to $R^6$ simultaneously or independently of one another are hydrogen or alkyl, aryl, aralkyl, heteroaryl or alkoxyalkyl radicals having 1 to 8 carbon atoms and the radicals may in each case be linear or branched, unbridged or bridged with other radicals, to form monocyclic, bicyclic or tricyclic systems, and the bridging atoms may in addition to carbon also be heteroatoms and additionally may have one or more alcohol, amino, ester, keto, thio, acid, urethane, urea or allophanate groups, double bonds, triple bonds or halogen atoms, in liquid polyurethane coating and adhesive compositions.

The catalysts B) of the present invention satisfy 1. the formula $[NR^1R^2R^3R^4]+[R^5COO]^-$, wherein $R^1$ to $R^4$ simultaneously or independently of one another are alkyl, aryl, aralkyl, heteroaryl or alkoxyalkyl radicals having 1 to 18 carbon atoms, in each case linear or branched, unbridged or bridged with other radicals $R^1$ to $R^4$, to form monocyclic, bicyclic or tricyclic systems, it being possible for the bridging atoms to include not only carbon but also heteroatoms and, additionally, for each radical $R^1$ to $R^4$ to have one or more alcohol, amino, ester, keto, thio, urethane, urea or allophanate groups, double bonds, triple bonds or halogen atoms, and $R^5$ is an alkyl, aryl, aralkyl, heteroaryl or alkoxyalkyl radical having 1 to 18 carbon atoms which is linear or branched and additionally may have one or more alcohol, amino, ester, keto, thio, acid, urethane, urea or allophanate groups, double bonds, triple bonds or halogen atoms, or
2. the formula $[NR^1R^2R^3R^4]+[R^5]^-$, wherein $R^1$ to $R^4$ simultaneously or independently of one another are alkyl, aryl, aralkyl, heteroaryl or alkoxyalkyl radicals having 1 to 18 carbon atoms, in each case linear or branched, unbridged or bridged with other radicals $R^1$ to $R^4$, to form monocyclic, bicyclic or tricyclic systems, it being possible for the bridging atoms to include not only carbon but also heteroatoms and, additionally, for each radical $R^1$ to $R^4$ to have one or more alcohol, amino, ester, keto, thio, acid, urethane, urea or allophanate groups, double bonds, triple bonds or halogen atoms, and $R^5$ is either OH or F, or
3. the formula $M(OR^1)_n(OR^2)_m(OR^3)_o(OR^4)_p(OR^5)_q(OR^6)_r$, wherein M is a metal in any positive oxidation state and is identical to the sum n+m+o+p+q+r, m, o, p, q, and r are integers from 0 to 6 and the sum n+m+o+p+q+r=1 to 6, the radicals $R^1$ to $R^6$ simultaneously or independently of one another are hydrogen or alkyl, aryl, aralkyl, heteroaryl or alkoxyalkyl radicals having 1 to 8 carbon atoms and the radicals may in each case be linear or branched, unbridged or bridged with other radicals, to form monocyclic, bicyclic or tricyclic systems, and the bridging atoms may in addition to carbon also be heteroatoms and additionally may have one or more alcohol, amino, ester, keto, thio, acid, urethane, urea or allophanate groups, double bonds, triple bonds or halogen atoms.

Examples of such catalysts in section 1 above are tetramethylammonium formate, tetramethylammonium acetate, tetramethylammonium propionate, tetramethylammonium butyrate, tetramethylammonium benzoate, tetraethylammonium formate, tetraethylammonium acetate, tetraethylammonium propionate, tetraethylammonium butyrate, tetraethylammonium benzoate, tetrapropylammonium formate, tetrapropylammonium acetate, tetrapropylammonium propionate, tetrapropylammonium butyrate, tetrapropylammonium benzoate, tetrabutylammonium formate, tetrabutylammonium acetate, tetrabutylammonium propionate, tetrabutylammonium butyrate, and tetrabutylammonium benzoate.

Examples of such catalysts in section 2 above are methyltributylammonium hydroxide, methyltriethylammonium hydroxide, tetramethylammonium hydroxide, tetraethylammonium hydroxide, tetrapropylammonium hydroxide, tetrabutylammonium hydroxide, tetrapentylammonium hydroxide, tetrahexylammonium hydroxide, tetraoctylammonium hydroxide, tetradecylammonium hydroxide, tetradecyltrihexylammonium hydroxide, tetraoctadecylammonium hydroxide, benzyltrimethylammonium hydroxide, benzyltriethylammonium hydroxide, trimethylphenylammonium hydroxide, triethylmethylammonium hydroxide, trimethylvinylammonium hydroxide, tetramethylammonium fluoride, tetraethylammonium fluoride, tetrabutylammonium fluoride, tetraoctylammonium fluoride, and benzyltrimethylammonium fluoride.

Examples of such catalysts in section 3 above are lithium hydroxide, sodium hydroxide, potassium hydroxide, rubidium hydroxide, cesium hydroxide, beryllium hydroxide, magnesium hydroxide, calcium hydroxide, strontium hydroxide, barium hydroxide, aluminum hydroxide, zinc hydroxide, lithium methoxide, sodium methoxide, potassium methoxide, magnesium methoxide, calcium methoxide, barium methoxide, lithium ethoxide, sodium ethoxide, potassium ethoxide, magnesium ethoxide, calcium ethoxide, barium ethoxide, lithium propoxide, sodium propoxide, potassium propoxide, magnesium propoxide, calcium propoxide, barium propoxide, lithium isopropoxide, sodium isopropoxide, potassium isopropoxide, magnesium isopropoxide, calcium isopropoxide, barium isopropoxide, lithium 1-butoxide, sodium 1-butoxide, potassium 1-butoxide, magnesium 1-butoxide, calcium 1-butoxide, barium 1-butoxide, lithium 2-butoxide, sodium 2-butoxide, potassium 2-butoxide, magnesium 2-butoxide, calcium 2-butoxide, barium 2-butoxide, lithium isobutoxide, sodium isobutoxide, potassium isobutoxide, magnesium isobutoxide, calcium isobutoxide, barium isobutoxide, lithium tert-butoxide, sodium tert-butoxide, potassium tert-butoxide, magnesium tert-butoxide, calcium tert-butoxide, barium tert-butoxide, lithium phenoxide, sodium phenoxide, potassium phenoxide, magnesium phenoxide, calcium phenoxide, and barium phenoxide.

Mixtures of the catalysts 1-3 can also be used. The catalysts are present in an amount of from 0.001 to 5% by weight, preferably from 0.01 to 3% by weight, based on the total amount of the components, in the polyurethane composition. The catalysts may include water of crystallization, in which case such water is not taken into account when calculating the amount of catalyst used. That is, the amount of water is removed from the calculation. Particular preference is given to using tetraethylammonium benzoate and tetrabutylammonium hydroxide.

One embodiment of the present invention includes the polymeric attachment of such catalysts B) to the curing agent A) or to the hydroxyl-containing polymers C) as well. For example, free alcohol, thio or amino groups of the ammonium salts can be reacted with acid, isocyanate or gycidyl groups of the curing agents A) or hydroxyl-containing polymers C) in order to integrate the catalysts B) into the polymeric system.

In the case of the hydroxyl- or amino-containing polymers C) it is preferred to use polyesters, polyethers, polyacrylates, polyurethanes, polyamidoamines, polyethers and/or polycarbonates having an OH number of from 20 to 500 (in mg KOH/gram) or a comparable amine content. Particular preference is given to polyesters having an OH number of from 30 to 150 and an average molecular weight of from 500 to 6000 g/mol. Such binders have been described in, for example, EP 0 669 354 and EP 0 254 152. Mixtures of such polymers can also be used.

The activity of these catalysts is significantly decreased in the presence of acids. The conventional reaction partners of the curing agents A) include hydroxyl-containing polyesters. Because of the way in which polyesters are prepared, they occasionally still include acid groups to a small extent. The acid group content of the polyesters ought to be below 20 mg KOH/g, since otherwise the catalysts are excessively inhibited. The acid group content includes all values and subvalues between 0 and 20 mg KOH/g, especially including 2, 4, 6, 8, 10, 12, 14, 16 and 18 mg KOH/g. In the presence of polyesters which carry such acid groups it is appropriate either to use the catalysts mentioned in excess, relative to the acid groups, or else to add reactive compounds which are capable of scavenging acid groups. Both monofunctional and polyfunctional compounds can be used for this purpose. The possibly crosslinking effect of the polyfunctional compounds, although unwanted in view of the viscosity-increasing effect, generally causes no disturbance, due to the low concentration.

Reactive acid-scavenging compounds D) are common knowledge in paint chemistry. For example, epoxy compounds, carbodiimides, hydroxyalkylamides or 2-oxazolines, but also inorganic salts such as hydroxides, hydrogencarbonates or carbonates, react with acid groups at elevated temperatures. Suitable examples include triglycidyl ether isocyanurate (TGIC), EPIKOTE® 828 (diglycidyl ether based on bisphenol A, Shell), Versatic acid glycidyl esters, ethylhexyl glycidyl ether, butyl glycidyl ether, Polypox R 16 (pentaerythritol tetraglycidyl ether, UPPC AG), and another Polypox grades containing free epoxy groups, Vestagon EP HA 320, (hydroxyalkylamide, Degussa AG), but also phenylenebisoxazoline, 2-methyl-2-oxazoline, 2-hydroxyethyl-2-oxazoline, 2-hydroxypropyl-2-oxazoline, 5-hydroxypentyl-2-oxazoline, sodium carbonate, and calcium carbonate. Mixtures of such substances are also suitable. These reactive compounds can be used in weight fractions of from 0.1 to 10%, preferably from 0.5 to 3%, based on the total formulation.

Acids specified under E) are all substances, solid or liquid, organic or inorganic, monomeric or polymeric, which possess the properties of a Brönsted acid or a Lewis acid. Examples that may be mentioned include the following: sulfuric acid, acetic acid, benzoic acid, malonic acid, and terephthalic acid, and also copolyesters or copolyamides having an acid number of at least 20.

Suitable solvents F) are all liquid substances which do not react with other ingredients, examples being acetone, ethyl acetate, butyl acetate, xylene, Solvesso 100, Solvesso 150, methoxypropyl acetate, and Dibasic ester.

In accordance with the present invention it is possible to add the additives G) customary in coatings or adhesives technology, such as leveling agents, e.g., polysilicones or acrylates, light stabilizers, e.g., sterically hindered amines, or other auxiliaries, as described in EP 0 669 353, for example, in a total amount of from 0.05 to 5% by weight. The amount of these additives includes all values and subvalues therebetween, especially including 0.1, 0.5, 1, 1.5, 2, 2.5, 3, 3.5, 4 and 4.5% by weight. Fillers and pigments such as titanium dioxide, for example, can be added in an amount up to 50% by weight of the total composition. The amount of these additives includes all values and subvalues between 0 and 50% by weight, especially including 5, 10, 15, 20, 25, 30, 35, 40 and 45% by weight.

Optionally additional catalysts such as are already known in polyurethane chemistry may be present. These are primarily organometallic catalysts, such as dibutyltin dilaurate, or else tertiary amines, such as 1,4 diazabicyclo[2.2.2]octane, for example, in amounts of from 0.001 to 1% by weight. The amount of the additional catalysts includes all values and subvalues therebetween, especially including 0.005, 0.01, 0.05, 0.1, 0.2, 0.3, 0.4, 0.5, 0.6, 0.7, 0.8, and 0.9% by weight.

All of the constituents for preparing the polyurethane composition of the present invention can be homogenized in suitable apparatus, such as heatable stirred tanks, kneading apparatus or else extruders, for example, in which upper temperature limits of 120 to 130° C. ought not to be exceeded. The upper temperature limit includes all values and subvalues therebetween, especially including 121, 122, 123, 124, 125, 126, 127, 128 and 129° C. After it has been thoroughly mixed, the composition is applied to the substrate by appropriate techniques, such as rolling and spraying. Application is followed by heating of the coated workpieces for the purpose of curing for from 4 to 60 minutes at a temperature of from 60 to 220° C., preferably from 6 to 30 minutes at from 80 to 160° C. The curing time includes all values and subvalues therebetween, especially including 5, 10, 15, 20, 25, 30, 35, 40, 45, 50 and 55 min. The curing temperature includes all values and subvalues therebetween, especially including 80, 100, 120, 140, 160, 180 and 200° C.

Having generally described this invention, a further understanding can be obtained by reference to certain specific examples which are provided herein for purposes of illustration only, and are not intended to be limiting unless otherwise specified.

EXAMPLES

| Ingredients | Product description, manufacturer |
|---|---|
| VESTAGON BF 1540 | curing agent, Degussa AG, Coatings & Colorants, uretdione content: 16.8%, m.p.: 99-112° C., $T_g$: 78° C. |
| TBAB | tetrabutylammonium benzoate, Aldrich | m.p.: melting point; Tg: glass transition point

Polyurethane compositions [coating material] (amounts in % by weight):

| Example | VESTAGON BF 1540 | Butyl acetate/xylene 1:1 | TBAB |
|---|---|---|---|
| 1 | 38.1 | 60 | 1.9 |
| C1* | 40 | 60 | — |

*comparative example

The polyurethane compositions are applied to steel panels (Bonder 901) using a coating bar and after the solvent has been flashed off briefly are cured in a forced-air oven at 150° C. for 30 minutes (dry film thickness: 25 to 30 μm).

The MEK test is performed as follows: A hammer weighing 2 kg is wrapped with a cotton pad that had been soaked in MEK (methyl-ethyl-ketone) beforehand. Then this hammer is pulled back and forward in double rubs until corrosion is perceptible on the lacquer.

The pendulum hardness was measured according to DIN EN ISO 1522.

| Example | MEK test | Pendulum hardness | Remarks |
|---|---|---|---|
| 1 | >100 | 195 | cured |
| C1* | 8 | not measurable | not cured |

German patent application 103 46 957.5 filed Oct. 9, 2003, is incorporated herein by reference.

Numerous modifications and variations on the present invention are possible in light of the above teachings. It is therefore to be understood that within the scope of the appended claims, the invention may be practiced otherwise than as specifically described herein.

The invention claimed is:

1. A high-reactivity liquid polyurethane composition comprising:
   A) at least one curing agent which contains at least one uretdione group and is obtained from i) an aliphatic polyisocyanate, a (cyclo)aliphatic polyisocyanate, a cycloaliphatic polyisocyanate or mixtures thereof, and ii) at least one hydroxyl-containing compound, said curing agent having a free NCO content of less than 5% by weight and a uretdione content of from 1 to 18% by weight;
   B) at least one catalyst selected from the group consisting of
   1) catalysts of the formula $[NR^1R^2R^3R^4]+[R^5COO]^-$ 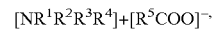

wherein $R^1$ to $R^4$ simultaneously or independently of one another are alkyl, aryl, aralkyl, heteroaryl or alkoxyalkyl radicals having 1 to 18 carbon atoms, in each case linear or branched, unbridged or bridged with other radicals $R^1$ to $R^4$, to form monocyclic, bicyclic or tricyclic systems, wherein a bridging atom is carbon and optionally a heteroatom and, optionally, each radical $R^1$ to $R^4$ has one or more alcohol, amino, ester, keto, thio, urethane, urea or allophanate groups, double bonds, triple bonds or halogen atoms, and
   $R^5$ is an alkyl, aryl, aralkyl, heteroaryl or alkoxyalkyl radical having 1 to 18 carbon atoms which is linear or branched and optionally has one or more alcohol, amino, ester, keto, thio, acid, urethane, urea or allophanate groups, double bonds, triple bonds or halogen atoms, and
   3) catalysts of the formula $M(OR^1)_n(OR^2)_m(OR^3)_o(OR^4)_p(OR^5)_q(OR^6)_r$, 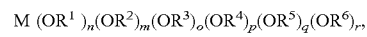

wherein M is a metal in a positive oxidation state and is identical to the sum n+m+o+p+q+r, m, o, p, q, and r are integers from 0 to 6 and the sum n+m+o+p+q+r=1 to 6,
   the radicals $R^1$ to $R^6$ simultaneously or independently of one another are hydrogen or alkyl, aryl, aralkyl, heteroaryl or alkoxyalkyl radicals having 1 to 8 carbon atoms and the radicals are in each case linear or branched, unbridged or bridged with other radicals, to form monocyclic, bicyclic or tricyclic systems, wherein a bridging atom is carbon and optionally a heteroatom which optionally has one or more alcohol, amino, ester, keto, thio, urethane, urea or allophanate groups, double bonds, triple bonds or halogen atoms,
   wherein at least one of catalysts 2) of the formula $[NR^1R^2R^3R^4]+[R^5]^-$, 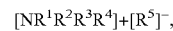

wherein $R^1$ to $R^4$ simultaneously or independently of one another are alkyl, aryl, aralkyl, heteroaryl or alkoxyalkyl radicals having 1 to 18 carbon atoms, in each case linear or branched, unbridged or bridged with other radicals $R^1$ to $R^4$, to form monocyclic, bicyclic or tricyclic systems, wherein a bridging atom is carbon and optionally a heteroatom and, optionally, each radical $R^1$ to $R^4$ has one or more alcohol, amino, ester, keto, thio, urethane, urea or allophanate groups, double bonds, triple bonds or halogen atoms, and $R^5$ is either OH or F, is optionally present, and wherein said catalysts 1), 2) and/or 3), individually or in mixtures, are optionally surrounded by an inert shell and hence encapsulated;

C) optionally, a hydroxyl-containing or amino-containing polymer having an OH number of between 20 and 500 mg KOH/g or the same amine content;

D) optionally, at least one compound which is reactive toward acid groups and has a weight fraction, based on the total formulation, of from 0.1 to 10%;

E) optionally, at least one acid in monomeric or polymeric form, in a weight fraction, based on the total formulation, of from 0.1 to 10%;

F) optionally, a solvent;

G) optionally, an auxiliary and/or an additive;

so that the fraction of the catalyst under B) is from 0.001 to 5% by weight of the total amount of the components;

wherein said composition has a melting point of below 40° C.

2. The polyurethane composition as claimed in claim 1, wherein component C) is present.

3. The polyurethane composition as claimed in claim 1, wherein component D) is present.

4. The polyurethane composition as claimed in claim 1, wherein component E) is present.

5. The polyurethane composition as claimed in claim 1, wherein component F) is present.

6. The polyurethane composition as claimed in claim 1, wherein component G) is present.

7. The polyurethane composition as claimed in claim 1, wherein components C)-G) are present.

8. The polyurethane composition as claimed in claim 1, wherein catalyst 1 is present.

9. The polyurethane composition as claimed in claim 1, wherein catalyst 2 is present.

10. The polyurethane composition as claimed in claim 1, wherein catalyst 3 is present.

11. The polyurethane composition as claimed in claim 1, wherein a starting component for component A) is at least one polyisocyanate containing at least one uretdione group, said polyisocyanate being selected from the group consisting of isophorone diisocyanate (IPDI), hexamethylene diisocyanate (HDI), 2-methylpentane diisocyanate (MPDI), 2,2,4-trimethylhexamethylene diisocyanate (TMDI), 2,4,4-trimethylhexamethylene diisocyanate (TMDI), norbomane diisocyanate (NBDI), methylenediphenyl diisocyanate (MDI), tetramethylxylylene diisocyanate (TMXDI) and mixtures thereof.

12. The polyurethane composition as claimed in claim 11, wherein IPDI and/or HDI are/is used.

13. The polyurethane composition as claimed in claim 1, wherein at least one hydroxyl-containing monomer, a hydroxyl-containing polymer or a mixture thereof are used as starting materials for the curing agent A).

14. The polyurethane composition as claimed in claim 13, wherein said hydroxyl-containing polymer is selected from the group consisting of polythioethers, polyethers, polycaprolactams, polyepoxides, polyesteramides, polyurethanes and mixtures thereof; and wherein said hydroxyl-containing monomer is selected from the group consisting of low molecular mass dialcohols, low molecular mass trialcohols, low molecular mass tetraalcohols and mixtures thereof, as chain extenders.

15. The polyurethane composition as claimed in claim 14, wherein further comprising monoamines and/or monoalcohols as chain terminators.

16. The polyurethane composition as claimed in claim 1, wherein the curing agent A) comprises an isocyanurate structure, a biuret structure, an allophanate structure, an urethane structure, an urea structure or combinations thereof.

17. The polyurethane composition as claimed in claim 8, wherein catalyst 1 is selected from the group consisting of tetramethylammonium formate, tetramethylammonium acetate, tetramethylammonium propionate, tetramethylammonium butyrate, tetramethylammonium benzoate, tetraethylammonium formate, tetraethylammonium acetate, tetraethylammonium propionate, tetraethylammonium butyrate, tetraethylammonium benzoate, tetrapropylammonium formate, tetrapropylammonium acetate, tetrapropylammonium propionate, tetrapropylammonium butyrate, tetrapropylammonium benzoate, tetrabutylammonium formate, tetrabutylammonium acetate, tetrabutylammonium propionate, tetrabutylammonium butyrate, tetrabutylammonium benzoate and mixtures thereof.

18. The polyurethane composition as claimed in claim 9, wherein catalyst 2 is selected from the group consisting of methyltributylanimonium hydroxide, methyltriethylammonium hydroxide, tetramethylammonium hydroxide, tetraethylammonium hydroxide, tetrapropylammonium hydroxide, tetrabutylammonium hydroxide, tetrapentylammonium hydroxide, tetrahexylanimonium hydroxide, tetraoctylammonium hydroxide, tetradecylammonium hydroxide, tetradecyltrihexylammonium hydroxide, tetraoctadecylammonium hydroxide, benzyltrimethylammonium hydroxide, benzyltriethylammonium hydroxide, trimethylphenylanimonium hydroxide, triethylmethylammonium hydroxide, trimethylvinylammonium hydroxide, tetramethylammonium fluoride, tetraethylammonium fluoride, tetrabutylammonium fluoride, tetraoctylammonium fluoride, benzyltrimethylammonium fluoride and mixtures thereof.

19. The polyurethane composition as claimed in claim 10, wherein catalyst 3 is selected from the group consisting of lithium hydroxide, sodium hydroxide, potassium hydroxide, rubidium hydroxide, cesium hydroxide, beryllium hydroxide, magnesium hydroxide, calcium hydroxide, strontium hydroxide, barium hydroxide, aluminum hydroxide, zinc hydroxide, lithium methoxide, sodium methoxide, potassium methoxide, magnesium methoxide, calcium methoxide, barium methoxide, lithium ethoxide, sodium ethoxide, potassium ethoxide, magnesium ethoxide, calcium ethoxide, barium ethoxide, lithium propoxide, sodium propoxide, potassium propoxide, magnesium propoxide, calcium propoxide, barium propoxide, lithium isopropoxide, sodium isopropoxide, potassium isopropoxide, magnesium isopropoxide, calcium isopropoxide, barium isopropoxide, lithium 1-butoxide, sodium 1-butoxide, potassium 1-butoxide, magnesium 1-butoxide, calcium 1-butoxide, barium 1-butoxide, lithium 2-butoxide, sodium 2-butoxide, potassium 2-butoxide, magnesium 2-butoxide, calcium 2-butoxide, barium 2-butoxide, lithium isobutoxide, sodium isobutoxide, potassium isobutoxide, magnesium isobutoxide, calcium isobutoxide, barium isobutoxide, lithium tert-butoxide, sodium tert-butoxide, potassium tert-butoxide, magnesium tert-butoxide, calcium tert-butoxide, barium tert-butoxide, lithium phenoxide, sodium phenoxide, potassium phenoxide, magnesium phenoxide, calcium phenoxide, barium phenoxide and mixtures thereof.

20. The polyurethane composition as claimed in claim 1, wherein tetraethylammonium benzoate and tetrabutylammonium hydroxide are used as catalysts.

21. The polyurethane composition as claimed in claim 1, wherein component B) is present in an amount of from 0.01 to 3% by weight, based on the total amount of the components.

22. The polyurethane composition as claimed in claim 2, wherein component C) is selected from the group consisting of polyesters, polyethers, polyacrylates, polyurethanes, polyamidoamines, polycarbonates and mixtures thereof.

23. The polyurethane composition as claimed in claim 22, wherein component C) is a polyester having an OH number of from 30 to 150 and an average molecular weight of from 500 to 6000 g/mol.

24. The polyurethane composition as claimed in claim 3, wherein component D) is an epoxy compound, a carbodiimide, a hydroxyalkylamide, 2-oxazoline, an inorganic salt or mixtures thereof.

25. The polyurethane composition as claimed in claim 24, wherein component D) is triglycidyl ether isocyanurate (TGIC), diglycidyl ether based on bisphenol A, versatic acid glycidyl esters, ethylhexyl glycidyl ether, butyl glycidyl ether, pentaerythritol tetraglycidyl ether, hydroxyalkylamide, phenylenebisoxazoline, 2-methyl-2-oxazoline, 2-hydroxyethyl-2-oxazoline, 2-hydroxypropyl-2-oxazoline, 5-hydroxypentyl-2-oxazoline, sodium carbonate, calcium carbonate or mixtures thereof.

26. The polyurethane composition as claimed in claim 4, wherein component E) is sulfuric acid, acetic acid, benzoic acid, malonic acid, terephthalic acid, copolyesters having an acid number of at least 20, copolyamides having an acid number of at least 20 or mixtures thereof.

27. The polyurethane composition as claimed in claim 6, wherein component G) is a leveling agent, a light stabilizer, a filler, a pigment or mixtures thereof.

28. The polyurethane composition as claimed in claim 1, further comprising a catalyst selected from the group consisting of organometallic catalysts, and tertiary amine.

29. A process for preparing a polyurethane composition as claimed in claim 1, comprising:
    mixing components A) and B) and optionally C)-G) in a heatable apparatus at a temperature below 130° C.

30. A coating, comprising the polyurethane composition as claimed in claim 1.

31. A method of coating a substrate, comprising:
    coating the substrate with the polyurethane composition as claimed in claim 1.

32. The method of claim 31, wherein said substrate is metal, plastic, glass, wood, a leather substrate or a heat-resistant substrate.

33. The polyurethane composition as claimed in claim 1, which is capable of being cured by heat only.

34. The polyurethane composition as claimed in claim 33, which is capable of being cured at a temperature of 100 to 160° C.

* * * * *